Figure 1:
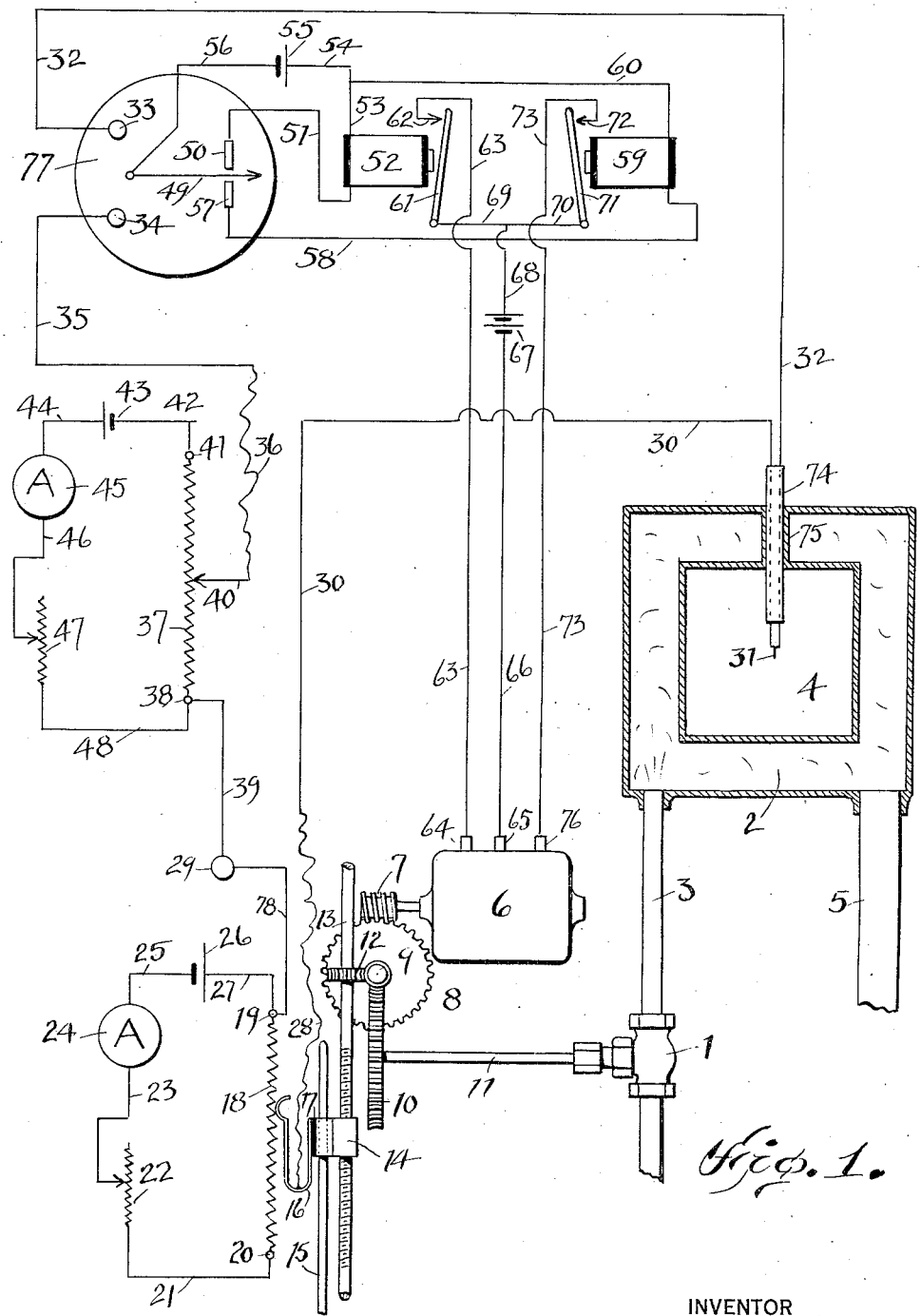

Jan. 19, 1932.  F. F. UEHLING  1,841,559

AUTOMATIC TEMPERATURE CONTROL DEVICE

Filed Feb. 6, 1930  2 Sheets-Sheet 1

INVENTOR
Fritz Frederick Uehling

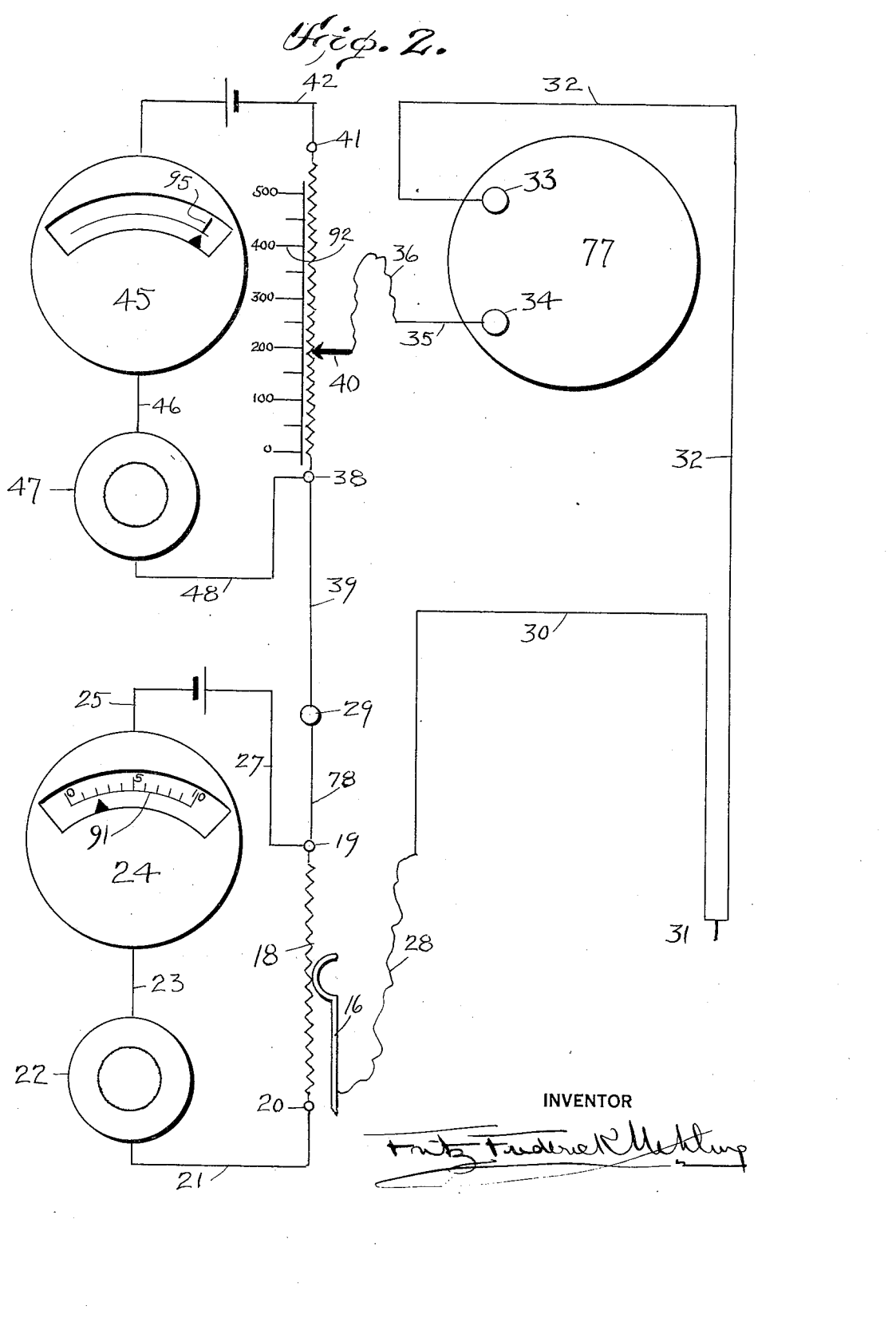

Patented Jan. 19, 1932

1,841,559

UNITED STATES PATENT OFFICE

FRITZ FREDERICK UEHLING, OF PASSAIC, NEW JERSEY

AUTOMATIC TEMPERATURE CONTROL DEVICE

Application filed February 6, 1930. Serial No. 426,429.

This invention relates to improvements in automatic temperature control apparatus. One of the objects of these improvements is to provide means for regulating the heat input to a furnace or oven in direct proportion to the heat required for maintaining the furnace or oven at a constant temperature within very narrow limits, thus preventing changes in the heat input in excess of what is actually required to maintain the desired temperature, thereby assuring a more even temperature and preventing the objectionable hunting action of the controller itself. The element of time is required before the temperature of a furnace can respond to a change in heat input and to prevent an excessive change in heat input due to this fact, is another object of this invention.

Figure 1 is a diagrammatic sketch which shows all of the principal parts of the invention with their electrical connections. Fig. 2 illustrates more particularly the adjusting elements of the invention.

The driving shaft of a motor 6 is provided with a worm 7 which meshes with a worm wheel 8. The shaft which carries the worm wheel 8 is also provided with a worm 9. The stem 11 of a valve 1 is provided with a worm wheel 10 which meshes with the worm 9. It thus follows that when the motor 6 operates in one direction the valve 1 will open, and when the motor operates in the opposite direction the valve 1 will close. Steam is provided through the valve 1 to heat a chamber 4. The steam enters an annular space 2, as illustrated, through a pipe 3 and exhausts through a pipe 5.

A worm wheel 12 which is fastened to a shaft 13 also meshes with the worm 9. The lower end of the shaft 13 is threaded as illustrated. These threads mesh with threads on the inside of a sleeve 14 which sleeve is guided by a rod 15 parallel to the shaft 13. The rod 15 is fastened in a fixed position and passes through a hole in an extension from the sleeve as illustrated, thus preventing rotation of the sleeve. The threads referred to are so designed that as the valve is opened by the motor the sleeve 14 will be lowered and conversely as the valve is being closed by the motor the sleeve 14 will be lifted. Since the illustration is merely diagrammatic, the fixed support for the rod 15 is not shown, neither are the bearings for the shaft 13 nor the bearings for the shaft which carried the worm 9 and the worm wheel 8.

A brush 16 is fastened to the sleeve 14 and is insulated therefrom by an insulation piece 17. The brush rests against a resistance wire 18, which resistance wire forms part of a circuit which includes the resistance wire 18, connection 20, wire 21, an adjustable rheostat 22, wire 23, an ammeter 24, wire 25, battery 26, wire 27 and connection 19. It thus follows that the drop in potential across the connection 19 and the brush 16 may be increased or decreased by operating the motor 6 in one direction or the other. The described circuit thus becomes a potentiometer capable of balancing electro-motive forces across the connection 19 and the brush 16, the drop in potential across the brush 16 and the connection 19 depending upon the position of the brush 16 and the current flowing through the circuit which is adjustable by the rheostat 22 and measurable by means of the ammeter 24.

A similar potentiometer is provided by means of the circuit which starts at battery 43 and continues through wire 42 to a connection 41, from the connection 41 through the resistance 37 to a connection 38 and thence through the wire 48, an adjustable rheostat 47, wire 46, an ammeter 45 and wire 44 back to the battery. An adjustable brush 40 rests against the resistance wire 37 thus making it possible to change the drop in potential between the brush 40 and the connection 38 by sliding the brush in one direction or the other along the resistance wire.

A thermo-couple 31 is inserted into the chamber 4 through an opening 75, the leads from which are insulated from each other by means of a porcelain tube 74. A circuit which includes the couple 31 starts at the couple and continues through wire 32 to binding post 33 of a galvanometer 77, from the binding post 33 through the galvanometer to binding post 34, from the binding post 34 through wire 35 and flexible connection 36 to the brush 40, from the brush 40 through the resistance wire 37 to the connection 38, from the connection 38 through wire 39, binding post 29 and wire 78 to the connection 19, thence through resistance wire 18 to brush 16, and from brush 16 through flexible connection 28 and wire 30 back to the couple thus completing the circuit.

The galvanometer is provided with an indicating needle 49 and two contact pieces 50 and 57. The indicating needle 49 and the contact piece 50 form part of the primary circuit of a relay which circuit starts at battery 55 thence through wire 56 to needle 49 and when the needle touches the contact piece 50 through wire 51 to magnet 52 of the relay and thence through wires 53 and 54 back to the battery. Likewise the indicating needle 49 and the contact piece 57 form part of the primary circuit of a second relay which circuit starts at battery 55 thence through wire 56 to needle 49 and when the needle touches the contact piece 57 through wire 58 to magnet 59 of the second relay and thence through wires 60 and 54 back to the battery.

It thus follows that when the needle of the galvanometer is deflected against the contact piece 50, the magnet 52 of the first relay will be energized, thereby attracting the armature 61 and closing a circuit through 61 and 62. Likewise it follows that when the needle of the galvanometer is deflected against the contact piece 57, the magnet 59 of the second relay will be energized, thereby attracting the armature 71 and closing a circuit through 71 and 72. The circuit which includes 61 and 62 operates the motor 6 in a given direction. This circuit starts at battery 67, thence through wires 68 and 69 to armature 61, from armature 61 through 62 and wire 63 to a binding post 64, from the binding post through the motor to a binding post 65, and thence through wire 66 back to the battery. Similarly the circuit which includes 71 and 72 operates the motor 6 in the opposite direction. This circuit starts at battery 67, thence through wires 68 and 70 to armature 71, from armature 71 through 72 and a wire 73 to a binding post 76, from the binding post 76 through the motor to the binding post 65, and thence through wire 66 back to the battery.

Let us for the present assume that the wire 30 from the couple 31 is directly connected with the wire 39, thereby entirely eliminating the resistance 18 and brush 16 from the circuit which includes the couple. Let us further assume that it is desired to maintain the temperature of the chamber 4 at 150 degrees. To bring about this condition the brush 40 is set to a position where the drop in potential across the brush 40 of the connection 38 is equal to and opposing the electro-motive force that will be created by the thermo-couple when the temperature reaches the predetermined 150 degrees already stated. The needle of the galvanometer is so adjusted that when there is no current flowing through the galvanometer it will remain in a position midway between the two contact pieces 50 and 57. Furthermore when the drop in potential across 38 and 40 is greater than the electromotive force of the couple, the needle will be deflected against the contact piece 50, and when the electro-motive force of the couple 31 is greater than the drop in potential across 38 and 40 then the needle will be deflected against the contact piece 57. It thus follows that so long as the temperature of the thermocouple is below 150 degrees, the drop in potential across 38 and 40 will be greater than the electro-motive force of the couple thus causing the needle of the galvanometer to be deflected against the contact piece 50. This, in the manner already stated, closes the circuit which actuates the first relay thereby closing the circuit which operates the motor 6 in the proper direction to open the valve 1. This valve will continue to open until the temperature of the thermo-couple has reached the predetermined 150 degress at which time the electro-motive force of the couple will equal the drop in potential across 40 and 41, and the needle of the galvanometer will assume its zero or normal position midway between the two contact pieces thereby opening the primary circuit through the first relay which stops the motor. In like manner should the temperature of the couple become higher than 150 degrees, the electro-motive force of the couple will be greater than the drop in potential across 38 and 40, thus causing the needle of the galvanometer to be deflected against the contact piece 57. This, in the manner already stated, closes the circuit which actuates the second relay thereby closing the circuit which operated the motor 6 in the proper direction to close the valve 1. This valve will continue to close until the temperature of the thermo-couple has again dropped to the predetermined 150 degrees at which time the electro-motive force of the couple will again equal the drop in potential across 40 and 41, and the needle of the galvanometer will again assume its normal position midway between the two contact pieces thereby opening the primary circuit through the second relay which stops the motor.

It is obvious from the above that when the temperature of the couple is above the predetermined temperature, the motor will cause valve 1 to close, and when the couple is below the predetermined temperature, the motor will cause the valve to open. Also when the couple is exactly at the predetermined temperature the motor will be dead. This action is however not sufficient for the control of the temperature within the narrow limits as today required in the average industrial application. The objectionable feature of almost every type of controller is caused by the fact that almost every type of furnace, oven or chamber, the temperature of which is to be maintained constant has an inherent lag. In other words the element of time comes into play in order to increase or decrease the temperature from one degree to another. It is for this reason that the average temperature controller excessively increases or excessively decreases the heat input in an attempt to keep the temperature constant. This results in maintaining a temperature constant only within comparatively wide limits depending upon the characteristics of the furnace or oven heated, or on the characteristics of the variations in the burden which the furnace carries. It is to eliminate this objection that I provide the drop in potential across the brush 16 and the connection 19 which drop is increased or decreased by the same motor which actuates the valve.

Let us now assume that the brush 16 and the resistance 18 are included in the circuit with the couple 31 as illustrated, and that the temperautre of 150 degrees for which the distance between 38 and 40 is set, has been slightly exceeded. This will obviously cause the needle 49 to touch the contact piece 57 thereby starting the motor 6 to close the valve. Ordinarily the valve would be closed entirely too much before the effect of the decreased heat input would be realized by the actual temperature of the couple. However, as the valve is being closed, the brush 16, in the manner already stated, lifts, thereby shortening the distance between the brush 16 and the connection 19 thus decreasing the drop in potential across these two points. The battery 26 is of such a polarity that the drop in potential across these two points. The battery 19 is in the same direction as the electro-motive force of the couple. In other words the electro-motive force which the drop across 38 and 40 is supposed to balance consists of the summation of the electro-motive force of the couple and the electro-motive force due to the drop across the brush 16 and the connection 19. It therefore follows that by decreasing the drop across the brush 16 and the connection 19, the same effect will be produced on the galvanometer that would be experienced by decreasing the temperature of the couple. Therefore as the valve is being closed due to the slightly high temperature of the couple, the electro-motive effect on the galvanometer would be artificially and immediately reduced by the brush 16, until the needle 49 is again midway between the two contact pieces, thus stopping the motor before the actual temperature of the thermo-couple has been decreased. If the temperature of the couple increases still further, its increased electro-motive force will obviously again deflect the needle against the contact piece 57 thereby actuating the motor to close the valve still further. As the valve is being closed the drop in potential across the brush 16 and connection 19 will be also still further reduced thereby again balancing the galvanometer before the reduced heat input has caused a drop in the actual temperature of the couple. This action will repeat itself until the reduced heat input as caused by the partial closing of the valve is sufficient to prevent any further rise in the temperature of the couple.

In like manner, let us now assume that the temperature of 150 degrees for which the distance between 38 and 40 is set, has slightly dropped. This will obviously cause the needle 49 to touch the contact piece 50 thereby starting the motor 6 to open the valve. Ordinarily the valve would be opened entirely too much before the effect of the increased input would be realized by the actual temperature of the couple. However, as the valve is being opened, the brush 16, in the manner already stated, is lowered, thereby increasing the distance between the brush 16 and the connection 19, thus increasing the drop in potential across these two points until the galvanometer is again balanced. It therefore follows that by increasing the drop across the brush 16 and the connection 19, the same effect will be produced on the galvanometer that would be experienced by increasing the temperature of the couple. Therefore as the valve is being opened due to the slightly lower temperature of the couple, the electro-motive effect on the galvanometer would be artificially and immediately increased by the brush 16, until the needle 49 is again midway between the two contact pieces, thus stopping the motor before the actual temperature of the couple has been increased. If the temperature of the couple decreases still further, its decreased electro-motive force will obviously again deflect the needle against the contact piece 50 thereby actuating the motor to open the valve still further. As the valve is being opened the drop in potential across the brush 16 and connection 19 will be also still further increased thereby again balancing the galvanometer before the increased heat input has caused an increase in the actual temperature of the couple. This action will continue until the increased heat input as caused by the partial opening of the valve is sufficient to prevent any further drop in the temperature of the couple.

It is obvious from the above that the motion of the brush 16 is such that the distance between the brush and the connection 19 will be greatest when the valve 1 is fully open and least when the valve is fully closed. In other words, when the valve is fully open the drop in potential across the brush 16 and the connection 19 will be greatest and when the valve is fully closed this drop in potential will be least; furthermore, said drop in potential will gradually increase as the valve is being opened and gradually decrease as the valve is being closed. The actual drop in potential between the brush 16 and the connection 19 for the different positions of the brush may be differently fixed by adjusting the rheostat 22. The position of the rheostat determines the current flowing through the resistance 18, which current is measured by the ammeter 24.

Let us now assume that the rheostat 22 is so adjusted that the current flowing through the resistance 18 is of the proper magnitude to cause a drop across the brush and the connection 19 (when the valve is wide open) equal to a change in the electro-motive force of the couple corresponding to two degrees. In such a case an increase of two degrees in the temperature of the couple would fully close the valve and a decrease of two degrees in the temperature of the couple would fully open the valve. The operation with the particular adjustment referred to would be as follows: Let us assume the valve partly open with the corresponding position of the brush 16 as illustrated. If the temperature of the couple increases a fraction of a degree, the corresponding increase in the electro-motive force of the couple will, in the manner already described, cause the motor to close the valve and simultaneously decrease the drop in potential across the brush 16 and the connection 19. It is obvious, however, that the valve will only close to a point where the decrease in potential across the brush and the connection 19 is equal to the increase in the electro-motive force of the couple, in which case the galvanometer will again be balanced and the motor will stop. If this slight closing of the valve will prevent a further increase in the temperature of the couple, then further closing of the valve will be impossible. However, if the temperature of the couple continues to increase, then the same action will repeat itself, in as many increments as necessary, until the valve is sufficiently closed to prevent further increase in temperature.

Similarly if the temperature of the couple decreases a fraction of a degree, the corresponding decrease in the electro-motive force of the couple will, in the manner already described, cause the motor to open the valve and simultaneously increase the drop in potential across the brush 16 and the connection 19. It is obvious, however, that the valve will only open to a point where the increase in potential across the brush and the connection 19 is equal to the decrease in the electro-motive force of the couple, at which time the galvanometer will again be balanced and the motor will stop. If this slight opening of the valve will prevent a further decrease in the temperature of the couple then further opening of the valve is impossible. However, if the temperature of the couple continues to decrease, then the same action will repeat itself, in as many increments as necessary, until the valve is sufficiently open to prevent further decrease in temperature.

In the particular case above described, the rheostat 22 was so adjusted that the change in drop across the brush 16 and the connection 19, between a fully open and a fully closed valve, would be equivalent to a change of two degrees in the temperature of the couple. This adjustment of the rheostat 22 would cause a definite reading on the ammeter 24. Similarly the rheostat 22 may be adjusted to a position where the change in the drop in potential across the brush 16 and the connection 19, between a fully open and a fully closed valve, would be equivalent to a change of four degrees in the temperature of the couple, in which the ammeter 24 would show a different reading. It is therefore obvious that the ammeter may be calibrated in degrees of temperature, the reading of which would determine the necessary change in the temperature of the couple to actuate the valve from its fully closed position to its fully open position or vice versa. In other words when the ammeter is adjusted to read two degrees, the valve will open or close in proportion to the ratio of the two degrees to the actual change in the temperature of the couple. That is to say, the ammeter 24 may be adjusted to any temperature reading thereby causing the valve to open or close in proportion to the ratio of that reading to the actual change in the temperature of the couple. It thus follows that the ammeter may be adjusted to best suit the lag and general characteristics of the furnace, the temperature of which is to be controlled. A scale 91 calibrated in degrees of temperature is therefore provided for the ammeter 24, Figure 2. The position of the pointer with respect to the scale determines the necessary change in temperature to actuate the valve 1 from one extreme position to the other. The change in temperature necessary to actuate the valve from one extreme position to the other may therefore be adjusted by the rheostat 22 and read on the ammeter scale. This adjustment may be made to suit the characteristics of the heater while the temperature which the control apparatus is to maintain constant is adjustable by the manually actuated brush 40.

The ammeter 45 is adjusted by means of the rheostat 47, for a definite current through the resistance 37. Therefore, the position of the brush 40, in the manner already stated, determines the temperature at which the furnace or oven, into which the couple is inserted, termines the temperature at which the furnace or oven, into which the couple is inserted, Figure 2, for determining the position of the brush with respect to the temperature it is desired to maintain.

I claim:

1. In a device of the class described, the combination with a thermo-couple, of a variable resistance, a circuit which includes the resistance, a second variable resistance, a second circuit which includes the second resistance, a third circuit which includes both resistances and the couple, means for changing the temperature of the couple, and means for changing the first resistance actuated by the temperature changing means.

2. In a device of the class described, the combination with a thermo-couple, of a galvanometer, a resistance, a second resistance, a circuit which includes the first resistance, a second circuit which includes the second resistance, a third circuit which includes the two resistances, the couple and the galvanometer, means for changing the first resistance actuated by the galvanometer, and independent means for changing the second resistance.

3. In a device of the class described, the combination with a thermo-couple, of a galvanometer, a resistance, a second resistance, a circuit which includes the first resistance, a second circuit which includes the second resistance, a third circuit which includes both resistances, the couple and the galvanometer, means for changing the first resistance, a heat throttling means, a motor controlled by the galvanometer for simultaneously actuating the resistance changing means and the heat throttling means, and independent means for changing the second resistance.

4. In a device of the class described, the combination with an adjustable potentiometer, a means for actuating the potentiometer, a second adjustable potentiometer, means for actuating the second potentiometer, a thermo-couple, a circuit which includes both potentiometers and the couple, and a motor controlled by the couple for operating the first actuating means.

5. In a device of the class described, the combination with a thermo-junction, of a binding post, an adjustable potentiometer for balancing the electro-motive force across the binding post and one of the poles of the junction, a second adjustable potentiometer for balancing the electro-motive force across the binding post and the other pole of the junction, means for changing the temperature of the junction, and means for actuating the temperature changing means and the second potentiometer proportionately.

6. In a device of the class described, the combination with a galvanometer having a deflectable needle, of a contact piece with which the needle makes electrical contact when deflected in one direction, a second contact piece with which the needle makes electrical contact when deflected in the opposite direction, a thermo-couple, a circuit which includes the couple and the galvanometer, an electric current flowing through the circuit, means for changing the temperature of the couple, means independent of the couple for changing the current flowing through the circuit, a motor for simultaneously actuating the temperature changing means and the current changing means, a circuit for operating the motor in one direction which is closed by contact between the needle of the galvanometer and the first contact piece, and a circuit for operating the motor in the opposite direction which is closed by contact between the needle of the galvanometer and the second contact piece.

7. In a device of the class described, the combination with a thermo-couple, of means for balancing the electro-motive force of the couple, a second means for balancing the electro-motive force of the couple, means for changing the temperature of the couple, means for simultaneously and proportionately actuating the first balancing means and the temperature changing means, and independent means for actuating the second balancing means.

8. In a device of the class described, the combination with a circuit which includes a resistance, of an electric current flowing through the circuit, means for adjusting the current, means for measuring the current, an electric connection at one end of the resistance, a sliding brush which rests against the resistance, a second circuit which includes a second resistance, an electric current flowing through the second circuit, means for adjusting the current, means for measuring the current, a second electric connection at one end of the second resistance, a second sliding brush which rests against the second resistance, a thermo-couple, a galvanometer, a third circuit which includes the couple, the galvanometer, that part of the first resistance between the first connection and the first brush, and that part of the second resistance between the second connection and the second brush, means for changing the temperature of the couple, a motor in geared connection with the second brush for actuating the temperature changing means, and means for operating the motor controlled by the galvanometer.

9. In a device of the class described, the combination with a thermo-junction, of a binding post, an electric connection between one of the poles of the junction and the binding post, a second binding post, an electric connection between the other pole of the junction and the second binding post, a third binding post, means for changing the temperature of the junction, a motor for actuating the changing means, a potentiometer actuated by the motor for balancing the electro-motive force across the first and third binding post, and a potentiometer independently actuated for balancing the electro-motive force across the second and third binding posts.

10. In a device of the class described, the combination with a thermo-junction, of two adjustable potentiometers connected in series for balancing the electro-motive force across the poles of the junction, means for changing the temperature of the junction, and a motor for simultaneously actuating the changing means and one of the potentiometers.

11. In a temperature control device, the combination with a thermo-couple, of a potentiometer capable of balancing the electro-motive force from the couple over the entire temperature range of the couple, a second potentiometer capable of balancing the electro-motive force of the couple over a comparatively narrow range, a circuit which includes both potentiometers and the couple, a chamber in which the couple is located, means for changing the rate of heat input to the chamber, and means for simultaneously actuating the second potentiometer and the heat input changing means.

12. In a temperature control device, the combination with a thermo-couple the electro-motive force from which changes with its temperature, of a galvanometer, a potentiometer, means for adjusting the potentiometer to balance any electro-motive force from the couple, a second potentiometer, means for adjusting the second potentiometer to balance only slight changes in the electro-motive force from the couple, a chamber in which the couple is located, a circuit which includes both potentiometers, the couple and the galvanometer, means for changing the heat input to the chamber, and means for proportionately actuating the heat input changing means and the second potentiometer adjusting means controlled by the galvanometer.

13. In a temperature control device the combination with a thermo-couple, of a galvanometer, a potentiometer, a second potentiometer, a circuit which includes the two potentiometers, the galvanometer and the couple, manual means for adjusting the first potentiometer to balance the electro-motive force of the couple for any given temperature of the couple, a chamber in which the couple is located, means for changing the heat input to the chamber, means for adjusting the second potentiometer, said means being in geared connection with the heat input changing means, means for changing the range of the second potentiometer, and a motor controlled by the galvanometer for actuating the heat input changing means.

14. In a device of the class described, the combination with a potentiometer with a fixed range, of means for adjusting the potentiometer said means being calibrated in temperature units, a second potentiometer with a variable range, said range being measused by an ammeter calibrated in temperature units, means for adjusting the second potentiometer, a throttling means in geared connection with the second potentiometer adjusting means, a circuit which includes both potentiometers, and means for actuating the throttling means controlled by the circuit.

15. In a device of the class described, the combination with a slide wire, of a brush slidably mounted on the wire, a fixed point on the wire, a second slide wire, a second brush slidably mounted on the second slide wire, a second fixed point on the second slide wire, a thermo-couple, a galvanometer, a circuit which includes the couple, the galvanometer, the first brush, that part of the first wire between the first brush and the first fixed point, and that part of the second wire between the second brush and the second fixed point, a second circuit which includes the first slide wire, means for adjusting the first brush to balance the electro-motive force of the couple for any given temperature, a scale over which the first brush moves calibrated in temperature units for determining the necessary position of the brush to balance the electromotive force of the couple for any given couple temperature, a third circuit which includes the second slide wire, means for adjusting the current flowing through the third circuit, a scale for the current measuring means calibrated in temperature units, said scale determining the necessary change in the temperature of the couple to balance the drop across the second wire, between the second fixed point and the second brush when the brush is in its extreme position, a motor for actuating the second brush, and means for actuating the motor controlled by the galvanometer.

FRITZ FREDERICK UEHLING.